United States Patent
Yamada (10) Patent No.: US 8,941,848 B2
(45) Date of Patent: Jan. 27, 2015

(54) PRINT CONTROLLING APPARATUS, METHOD, AND STORAGE MEDIUM TO CONTROL PRIMARY AND SECONDARY PRINT DRIVERS

(75) Inventor: Satoru Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 13/561,562

(22) Filed: Jul. 30, 2012

(65) Prior Publication Data

US 2013/0038887 A1 Feb. 14, 2013

(30) Foreign Application Priority Data

Aug. 11, 2011 (JP) ................. 2011-176107

(51) Int. Cl.
*G06F 3/12* (2006.01)

(52) U.S. Cl.
CPC ............ *G06F 3/1205* (2013.01); *G06F 3/1228* (2013.01); *G06F 3/1245* (2013.01); *G06F 3/1285* (2013.01); *G06F 3/1225* (2013.01)
USPC ..................................................... 358/1.13

(58) Field of Classification Search
CPC ... G06F 3/1205; G06F 3/1225; G06F 3/1228; G06F 3/1245; G06F 3/1285
USPC ......................................................... 358/1.13
See application file for complete search history.

(56) References Cited

U.S. PATENT DOCUMENTS

| | | | |
|---|---|---|---|
| 7,835,024 B2 | 11/2010 | Yamada | |
| 2006/0026600 A1* | 2/2006 | Yoshida | ................. 719/310 |
| 2009/0097047 A1* | 4/2009 | Mitsui | ................. 358/1.9 |
| 2010/0309500 A1 | 12/2010 | Suzuki | |
| 2011/0063660 A1 | 3/2011 | Yamada | |

FOREIGN PATENT DOCUMENTS

JP     2010-286873     12/2010

* cited by examiner

*Primary Examiner* — Fred Guillermety
(74) *Attorney, Agent, or Firm* — Oblon, Spivak, McClelland, Maier & Neustadt, L.L.P.

(57) ABSTRACT

A novel print controlling apparatus that facilitates providing easy services that use printer drivers. The print controlling apparatus that executes a print job on a printing apparatus, and includes an additional feature driver 130 that acquires image to be printed and print settings set by a user by working as a printer driver and generates a print data in a format with open specifications by processing the acquired image, an individual driver 150 as a printer driver that generates a print job to be sent to a printer 2 designated in the print settings, and a reprint controlling unit 140 that has the individual driver 150 generate the print job based on the generated print data.

20 Claims, 9 Drawing Sheets

```
<?xml version="1.0" encoding=UTF-8" ?>
<psf:PrintTicket xmlns:psf=" http://schemas. ···
    xmlns:xsd=" http://www.w3.org/2001/XMLSchema"···
    xmlns:psk=" http://schemas ···
    xmlns:ns0000=" http://schemas ···

| FEATURE NAME | PROGRAM NAME | CALLING TIMING |
|---|---|---|
| PROCESS DATA | data.exe | Printing |
| PREVIEW | preview.exe | EndDoc |
| CHANGE PRINT SETTINGS | print_config.exe | Create |
| ... | | |

PRINT CONTROLLING APPARATUS, METHOD, AND STORAGE MEDIUM TO CONTROL PRIMARY AND SECONDARY PRINT DRIVERS

CROSS-REFERENCE TO RELATED APPLICATION

This patent application is based on and claims priority pursuant to 35 U.S.C. §119 to Japanese Patent Application No. 2011-176107, filed on Aug. 11, 2011, the entire disclosure of which is hereby incorporated by reference herein.

BACKGROUND OF THE INVENTION

1. Field of the Invention

The present invention relates to a print controlling apparatus, a print controlling method, and a storage medium that stores a software program implementing the print controlling method on a computer, and more particularly to a configuration to execute a printing process on a printing apparatus via information processing apparatuses.

2. Description of the Related Art

Along with the promotion of computerized information, image processing apparatuses such as printers and facsimiles that output computerized information and scanners that computerize documents have become indispensable. Many of these image processing apparatuses are configured as multi functional peripherals (MFPs) available as printers, facsimiles, scanners, and copiers by including functions such as scanning, image forming, and communicating.

Among these image processing apparatuses, printers that execute printing based on print jobs generated by information processing apparatuses such as personal computers (PCs) are widely used. Also, printer drivers adapted to individual printer functions are generally installed in the information processing apparatuses as software programs that implement the ability to generate print jobs to input to the printers.

Printer drivers generate print jobs by converting image information to be printed and print setting information into information written in Page Description Languages (PDLs) such as PostScript (PS) and Printer Control Language (PCL).

Also, a method that controls printing apparatuses by dividing the printer driver into two stages, a printer driver to send a print job to each printing apparatus and a virtual printer driver to send a print job to each printer driver, is proposed (e.g., JP-2010-286873-A.)

Nowadays, regarding printing apparatuses, various services are provided by expanding features of printer drivers and having printer drivers collaborate with other systems. However, there are many kinds of printer drivers that support not only PS and PCL described above but also proprietary PDL languages developed by printing apparatus manufacturers. Accordingly, it is necessary to develop from scratch a printer driver for a PDL language that supports services provided by another printer driver compliant with another specific PDL language, which burdens developers.

Also, depending on the specifications of a PDL language, it is occasionally difficult to expand features of the PDL language and collaborate with other systems especially if the specifications are not open, as with manufacturers' proprietary PDL languages. In this connection, it should be noted that the method described in JP-2010-286873-A is directed to controlling a print job destination, and thus the purpose of that invention is different from that of the present invention, which is directed to expanding various features by using printer drivers.

BRIEF SUMMARY OF THE INVENTION

The present invention provides a novel print controlling apparatus, method, and storage medium that facilitates providing services that use printer drivers.

More specifically, the present invention provides a print controlling apparatus that executes a print job on a printing apparatus, and includes a first print information generating unit that acquires image to be printed and print settings set by a user by working as a printer driver and generates first print information in a format with open specifications by processing the acquired image, a second print information generating unit as a printer driver that generates second print information to be sent to the printing apparatus designated in the print settings, and a reprint controlling unit that has the second print information generating unit generate the second print information based on the generated first print information.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings. In this embodiment, a description is given of an example of a PC that inputs print jobs to printing apparatuses and functions as a print controlling apparatus, in which an additional feature driver that outputs image information to be printed in a data format whose specifications are disclosed after implementing additional features, an individual driver that generates print jobs in a data format adapted to each printing apparatus, and a reprint controlling module that inputs the information output by the additional feature driver to the individual driver as a print command are installed.

Figure 1:
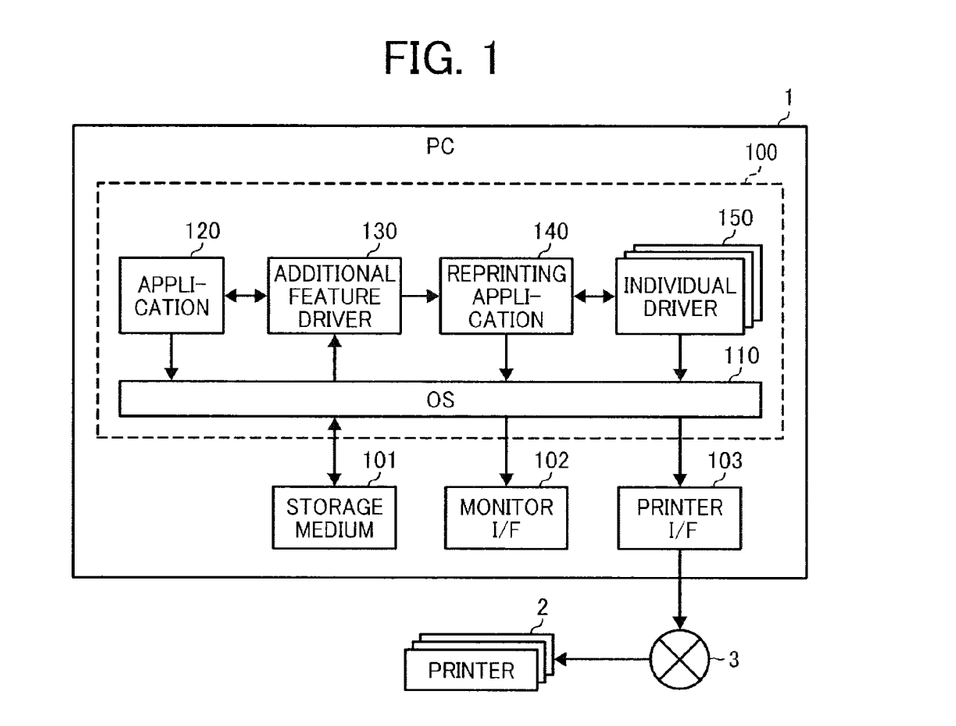
FIG. 1 is a block diagram illustrating a functional configuration of a printing system as an embodiment of the present invention.

FIG. 1 is a block diagram illustrating a functional configuration of a printing system as an embodiment of the present invention. As shown in FIG. 1, the printing system of this embodiment includes a PC 1 and a plurality of printers 2, and the PC 1 is connected to the printer 2 via a network 3. In the PC 1, installed application programs and printer drivers run on an OS 110 provide functions such as creating documents and editing images, and provide information that becomes a source of an image to be printed in response to a user operation.

As shown in FIG. 1, the PC 1 includes a controller 100, a storage medium 101, a monitor I/F 102, and a printer I/F 103. Also, the controller 100 includes the OS 110, an application 120, an additional feature driver 130, a reprint controlling module 140, and a plurality of individual drivers 150.

The storage medium 101 is a storage device that stores digitalized information and is implemented as storage devices such as hard disk drives (HDDs). The monitor I/F 102 is an interface that connects a display monitor, and interfaces such as Digital Visual Interface (DVI) are used as the monitor I/F 102. The printer I/F 103 is an interface that connects the PCI and a plurality of printers 2, and Ethernet is used as the printer I/F 103 in this embodiment.

The OS 110 is base software such as Windows and provides a graphical user interface (GUI) and interfaces that control hardware. Also, the OS 110 in this embodiment acquires image data and document data to be printed from the application 120 and generates intermediate data which the additional feature driver processes.

The application 120 is software that implements functions to browse and edit image data and document data. As described above, the application 120 inputs image data and document data to the OS 110 under browsing or editing in response to a user operation, and requests the OS 110 to generate the intermediate data described above.

The additional feature driver 130 is a first print information generating unit recognized as a primary printer driver by the application 120 and the OS 110 just like conventional printer drivers. The additional feature driver 130 generates a print data as image information written in a PDL language based on the intermediate data generated by the OS 110 and a print setting data that indicates print settings set by a user. The print data and the print setting data are used as print information. This print data is used as image information whose image to be printed is converted into format with open specifications, and the print setting data is used as setting information whose print setting is converted into a format with open specifications.

It should be noted that the additional feature driver 130 generates print information written in a PDL language whose specification is opened. In this embodiment, the additional feature driver 130 uses XML Paper Specification (XPS) as the PDL language whose specification is opened. The additional feature driver 130 also generates a print setting data in Print-Ticket format whose specification is opened. The development easiness of expanding features using the additional feature driver 130 can be improved by adopting these kinds of de facto standard specifications.

Moreover, the additional feature driver 130 implements additional features provided by expanding features of printer drivers. Additional features implemented by the additional feature driver 130 are executable by using software processing without using hardware of the printer 2. As described above, one of the keystones of this embodiment is to improve the easiness of adding features by implementing additional features using the additional feature driver 130 that outputs information in a format with open specifications.

The reprint controlling module 140 is a reprint controlling unit that commands the individual driver 150 adapted to each printer 2 to execute printing, i.e. reprinting, based on the information output by the additional feature driver 130. This reprint controlling module 140 makes it possible to have the individual driver 150 adapted to each printer 2 work in the same way as if it were directly operated by the application 120 conventionally.

The individual driver 150 generates a print job that includes image information written in a format adapted to each printer 2 based on the print request from the reprint controlling module 140, and sends the generated print job to the printer 2 via the network. That is, the individual driver 150 is a second print information generating unit that works as a secondary printer driver. Printing is executed when the individual driver 150 works.

Figure 2:
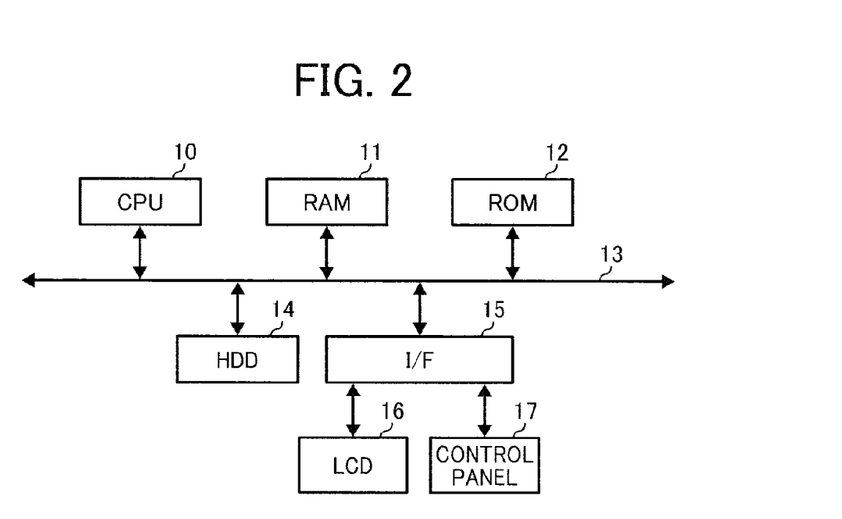
FIG. 2 is a block diagram illustrating hardware architecture of a PC as an embodiment of the present invention.

It should be noted that functions shown in FIG. 1 are implemented by a combination of software and hardware. Hardware configuration of the PC 1 of this embodiment is described below with reference to FIG. 2. As shown in FIG. 2, the PC 1 of this embodiment has the same configuration as general-purpose information processing devices. That is, a central processing unit (CPU) 10, a random access memory (RAM) 11, a read only memory (ROM) 12, a hard disk drive (HDD) 14, and an I/F 15 are interconnected via a bus 13 in the PC 1 of this embodiment. Also a liquid crystal display (LCD) 16 and a control unit 17 are connected to the I/F 15.

The CPU 10 controls the whole PC 1. The RAM 11 is a volatile storage device that can read/write data at high speed and is used as a working area when the CPU 10 processes information. The ROM 12 is a nonvolatile storage device that can only read data and stores programs such as firmware.

The HDD 14 is a nonvolatile storage device that can read/write data, and stores various control programs such as the OS 110, application programs, and other programs that construct the controller 100. The HDD 14 functions as the storage medium 101 in FIG. 1.

The I/F 15 connects the bus 13 to various hardware and networks, etc., and controls them. Also, the I/F 15 functions as the monitor I/F 120 and the printer IN 130 in FIG. 1. The LCD 16 is a visual user interface on which a user can check the status of the PC 1. The control unit 17 is a user interface such as a keyboard and a mouse with which a user can input information to the PC 1.

In this kind of hardware configuration, after programs stored in storage devices such as the ROM 12, the HDD 14 and optical disks (not shown in figures) are read from those storage devices and sent to the RAM 11, software controlling unit is configured by the CPU 10's operating along with those programs. The combination of the software controlling unit described above and hardware constructs functional blocks that implement functions of the PC 1 of this embodiment as shown in FIG. 1.

Next, processes of the additional feature driver 130, the reprint controlling module 140, and the individual driver 150 of this embodiment are described in detail below with reference to FIG. 3. As described above, the application 120 activates the additional feature driver 130 as the primary printer driver in response to a user operation, and acquires print setting information set via the GUI of the additional feature driver 130 in information format called DEVMODE structure.

After entering a print executing command in response to a user operation, the application 120 activates a graphics device interface (GDI) which is a drawing engine included in the OS 110, has the GDI generate intermediate data, and enters a print command to the additional feature driver 130.

After generating the intermediate data by using the GDI, the OS 110 enters the intermediate data to the additional feature driver 130. The additional feature driver 130 processes the intermediate data acquired from the OS 110 along with the setting information set by a user, generates a print data in XPS format as shown in FIG. 3, converts the DEVMODE structure to a print setting data in PrintTicket format, and stores the print setting data to the storage medium 101. Also, the additional feature driver 130 enters a print command to the reprint controlling module 140.

Figure 4:
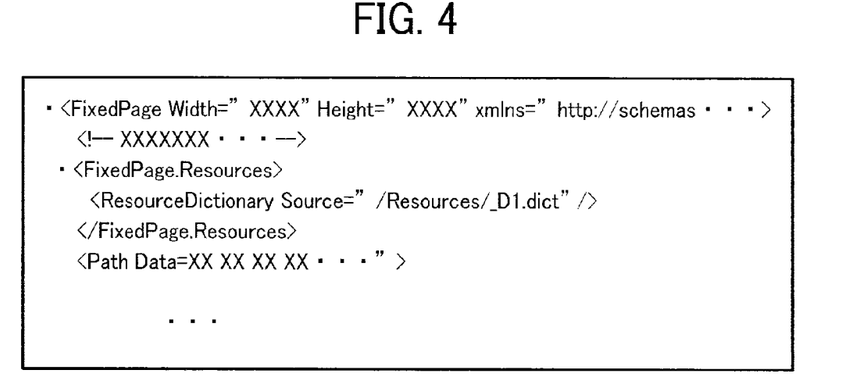
FIG. 4 is a diagram illustrating a data format of print data as an embodiment of the present invention.
Figure 5:
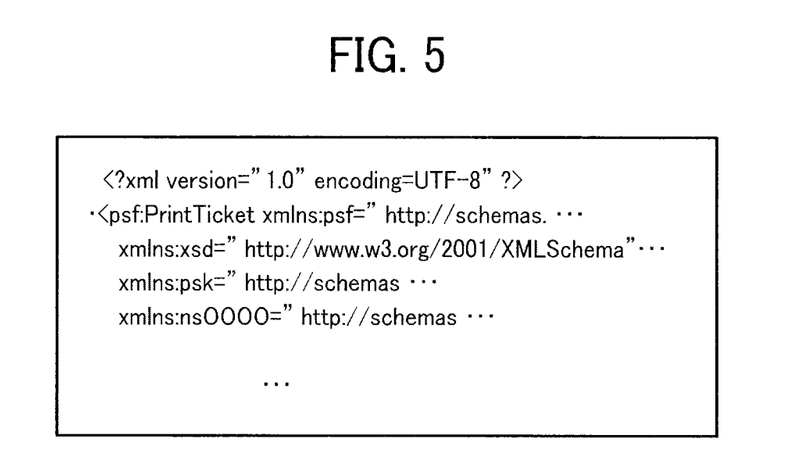
FIG. 5 is a diagram illustrating a data format of print setting data as an embodiment of the present invention.

Data format of print data and print setting data is described below. FIG. 4 and FIG. 5 are diagrams that illustrate data format of the print data and the print setting data. As shown in FIG. 4 and FIG. 5, both of the print data in XPS format and the print setting data in PrintTicket format in this embodiment are written in eXtensible Markup Language (XML) and easy to edit.

After acquiring the print data and the print setting data from the storage medium 101 in response to the print command by the additional feature driver 130, the reprint controlling module 140 activates the individual driver 150 just as the application 120 activates the additional feature driver 130 and commands the individual driver 150 to execute printing. When the reprint controlling module 140 activates the individual driver 150, the reprint controlling module 140 determines the individual driver 150 to be activated based on the PrintTicket information. The reprint controlling module 140 of this embodiment implements various features by adding features as plug-ins.

Figure 3:
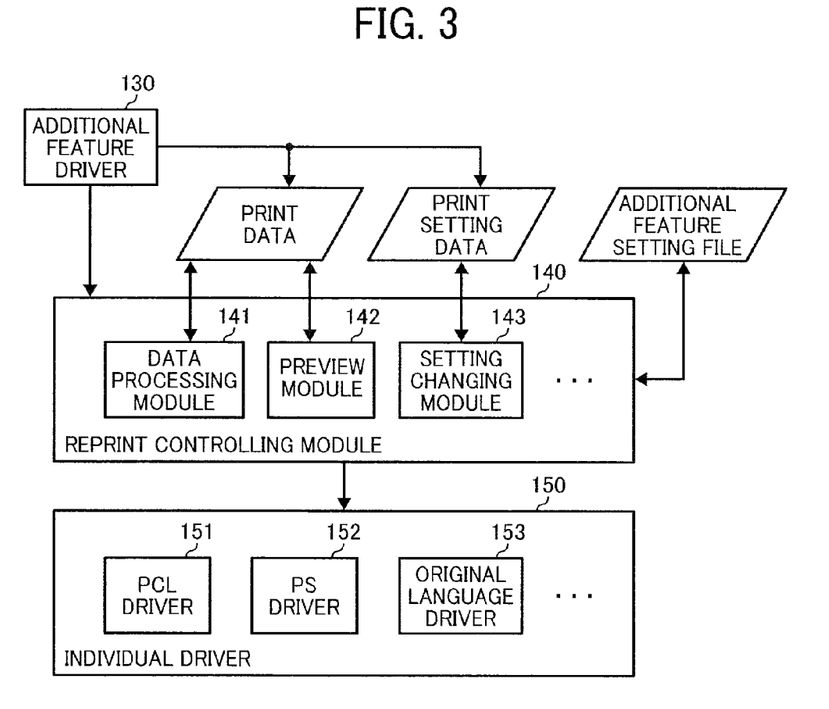
FIG. 3 is a diagram illustrating a module in a PC in detail as an embodiment of the present invention.

As shown in FIG. 3, the reprint controlling module 140 of this embodiment includes a data processing module 141, a preview module 142, and a setting changing module 143 as features implemented by plug-ins. In the reprint controlling module 140, the preview module 142 acquires a print data from the storage medium 101 along with the print command by the additional feature driver 130, and displays preview GUI of the printout on the LCD 16 via the monitor I/F 102. Accordingly the user can refer to the preview of the printout before sending the print job to the printer 2 and after converting the original image data into the print data.

The data processing module 141 processes the print data in response to the user operation with the GUI of the reprint controlling module 140 to display the preview by the preview module 142. That is, the GUI of the reprint controlling module 140 includes a display part that displays the preview of the print data and a user interface with which the user commands the data processing module 141 to process the data. In other words, the GUI of the reprint controlling module 140 provides an interface that enables the user to operate image processing by editing XML.

The setting changing module 143 acquires the print setting data from the storage medium 101 along with the print command from the additional feature driver 130, and changes settings of the print setting data in response to the user operation on GUI of the reprint controlling module 140. That is, GUI of the reprint controlling module 140 includes a user interface on which the user commands the setting changing module 143 to change the settings. In other words, GUI of the reprint controlling module 140 provides a user interface that enables the user to change the settings by editing XML.

Figure 6:
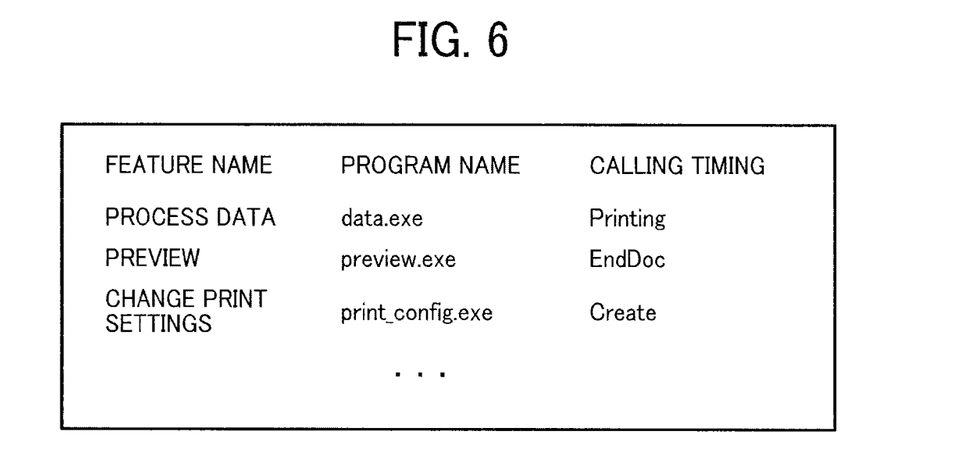
FIG. 6 is a diagram illustrating an example of an additional feature setting file as an embodiment of the present invention.

The reprint controlling module 140 manages features of the data processing module 141, the preview module 142, and the setting changing module 143 by using an additional features setting file shown in FIG. 6. As shown in FIG. 6, the additional features setting file includes information such as "feature name", "program name", and "calling timing."

"Feature name" is used as an identifier to identify each feature, the data processing module 141, the preview module 142, and the setting changing module 143. "Program name" is information that indicates a program name that constructs each feature, the data processing module 141, the preview module 142, and the setting changing module 143. "Calling timing" is information that indicates when each feature is executed.

The individual driver 150 in this embodiment includes a PCL driver 151, a PS driver 152, and a proprietary language driver 153 as shown in FIG. 3. These drivers are provided from manufacturers depending on the configuration of the printer 2, and generate a print data in language format supported by each printer 2.

While keeping the individual driver 150 that is provided for each printer 2, the additional feature driver 130 that acts as a primary driver just like conventional printer drivers for the application 120 and accepts a print command is also set in this embodiment. Also, the reprint controlling module 140 that enters a print command in the individual driver 150 that acts as a secondary driver in response to an output result of the additional feature driver 130, i.e. executes reprinting, is set.

After executing processes provided by the additional features, the additional feature driver 130 outputs print data and print setting data in a generic format whose specification is opened. That enables the individual driver 150 to generate a print job with conventional process and execute printing on the corresponding printer 2 in response to the reprint command issued by the reprint controlling module 140.

Figure 7:
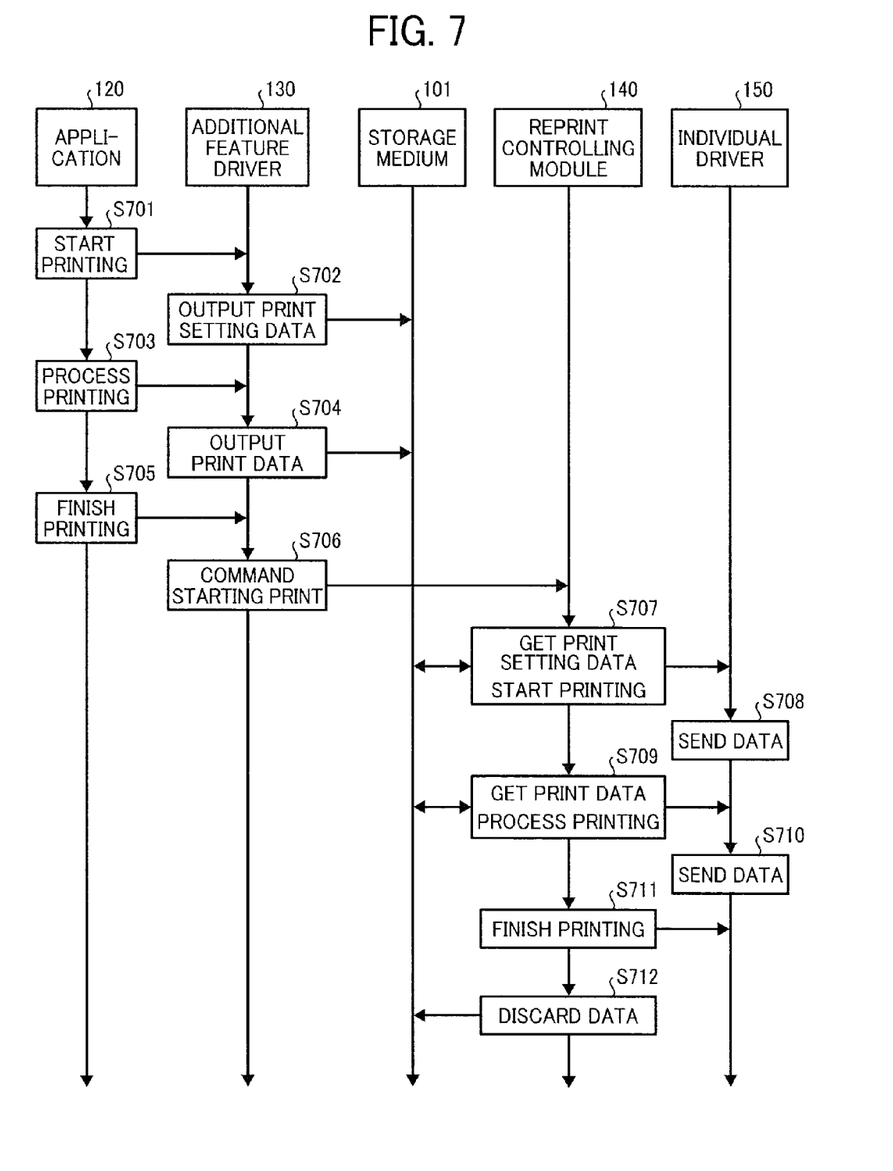
FIG. 7 is a sequence diagram illustrating an operation of a system as an embodiment of the present invention.

Next, the whole operation of printing output of the PC 1 in this embodiment is described below with reference to the sequence diagram in FIG. 7. As shown in FIG. 7, first, the application 120 starts printing in response to a user operation (S701), and inputs print setting information set by the user to the additional feature driver 130. Accordingly, the additional driver 130 converts the print setting information acquired in DEVMODE structure to PrintTicket format, and stores it to the storage medium 101 (S702).

After starting printing in response to the user operation, the application 120 also inputs intermediate data to the additional feature driver 130 via the OS 110 (S703). The intermediate data generated by the OS 110 can be in Enhanced MetaFile (EMF) or XPS format. Accordingly, after executing process on the additional feature based on the print settings acquired in S701, the additional feature driver 130 stores the print data in XPS format to the storage medium 101 (S704).

After finishing outputting the print setting information and the intermediate data, the application 120 reports to the additional feature driver 130 that the printing process is finished (S705). Accordingly, the additional feature driver 130 requests the reprint controlling module 140 to start printing (S706).

After receiving the command to start printing, i.e. reprinting, from the additional driver 130, the reprint controlling module 140 acquires the print setting data from the storage medium 101, and commands the individual driver 150 to start printing based on the print setting data (S707). In S707, after determining which individual driver 150 to activate based on the print setting data acquired from the storage medium 101, the reprint controlling module 140 sends the print setting data to the determined individual driver 150.

After receiving the print setting data from the reprint controlling module 140, the individual driver 150 sends the print setting data converted to the format that the corresponding printer 2 supports (S708). Accordingly, that starts sending the print job to the printer 2. Also, after starting printing, the reprint controlling module 140 acquires the print data from the storage medium 101 and executes the printing process by inputting the acquired print data to the individual driver 150 (S709). Accordingly, the individual driver 150 converts the print data acquired from the reprint controlling module 140 to the format that the corresponding printer 2 supports, and sends it to the printer 2 (S710). That makes the printer 2 start printing.

After finishing sending the print data stored in the storage medium 101 as a chain of printing process data, the reprint controlling module 140 reports the individual driver 150 that the printing process is finished (S711). Accordingly, the individual driver 150 finishes sending the print job. Subsequently, the reprint controlling module 140 discards the print setting data and the print data that has been sent to the individual driver 150 (S712), and finishes processing.

Figure 8:
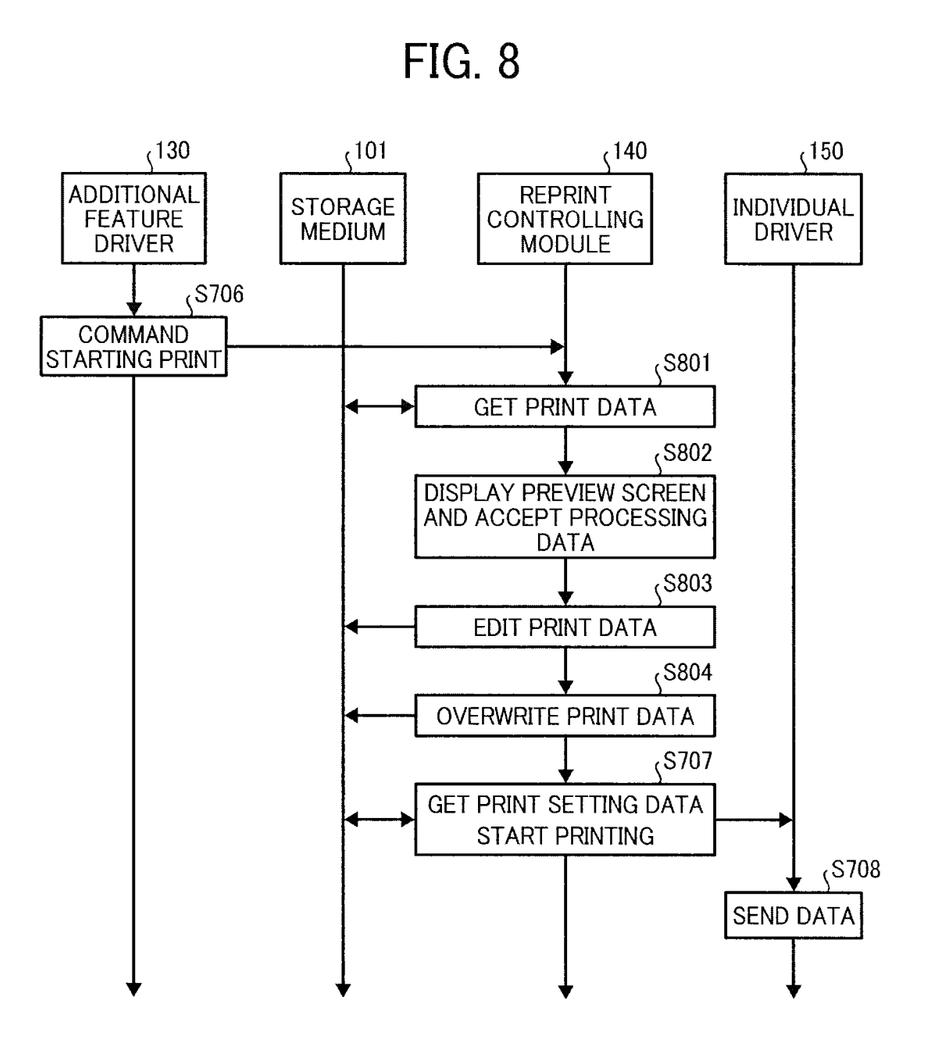
FIG. 8 is a sequence diagram illustrating an operation of a system as an embodiment of the present invention.

Next, how the preview module 142 and the data processing module 141 of the reprint controlling module 140 work is described with reference to FIG. 8. The operation of the reprint controlling module 140 between S706 and S707 in FIG. 7 is described below with reference mainly to FIG. 8. As shown in FIG. 8, the reprint controlling module 140 receives a command to start printing from the additional feature driver 130 in S706.

After receiving the command to start printing, the reprint controlling module 140 acquires the print data from the storage medium 101 if preview and data processing are selected in the additional feature setting file in FIG. 6 (S801). Subsequently, the reprint controlling module 140 generates a GUI that includes a preview screen, has the LCD 16 display the GUI, and accepts processing the data in response to the user operation on the GUI (S802).

After accepting processing the data, the reprint controlling module 140 edits the print data along with the accepted operation (S803), and overwrites the edited print data on the storage medium 101 (S804). Subsequently, the reprint controlling module 140 executes the processes in S707 and subsequent steps described above, thereby completing processes executed by the data processing module 141 and the preview module 142 implemented as plug-ins for the reprint controlling module 140 in this embodiment. As described above, the reprint controlling module 140 determines whether or not processes from S801 to S804 are executed based on information in the additional feature setting file as described above.

Figure 9:
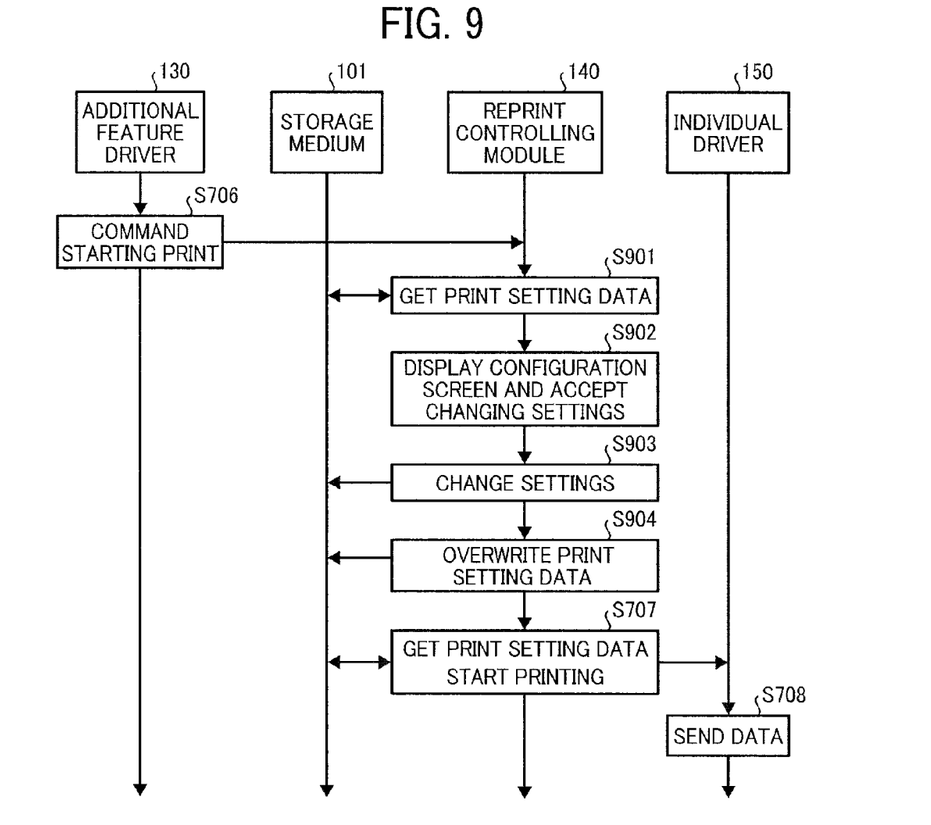
FIG. 9 is a sequence diagram illustrating an operation of a system as an embodiment of the present invention.

Next operation in case the setting changing module 143 of the reprint controlling module 140 works is described with reference to FIG. 9. Also, the operation of the reprint controlling module 140 between S706 and S707 in FIG. 7 is mainly described below with reference to FIG. 9. As shown in FIG. 9, the reprint controlling module 140 receives a command to start printing from the additional feature driver 130 in S706.

After receiving the command to start printing, the reprint controlling module 140 acquires the print setting data from the storage medium 101 if print setting changing feature is selected in the additional feature setting file in FIG. 6 (S901). Subsequently, the reprint controlling module 140 generates GUI that includes a setting changing screen, has the LCD 16 display the GUI, and accept operation on changing the settings in response to the user operation on the GUI (S802).

After accepting operation on changing the setting, the reprint controlling module 140 edits the print setting data along with the accepted operation (S903), and overwrites the edited print setting data on the storage medium 101 (S904). Subsequently, the reprint controlling module 140 executes processes in S707 and later described above. Accordingly, processes executed by the setting changing module 143 implemented as plug-ins for the reprint controlling module 140 in this embodiment are finished. As described above, the reprint controlling module 140 determines whether or not processes from S901 to S904 are executed based on information in the additional feature setting file as described above.

It should be noted that the GUI of the reprint controlling module 140 is used as a GUI for changing the settings screen in the description of FIG. 9. However, since the reprint controlling module 140 is configured to input print commands to the individual driver 150, the reprint controlling module 140 can call the GUI of the individual driver 150. Therefore, the reprint controlling module 140 can call the GUI of the individual driver 150 in S902, and display the changing settings screen reflecting the print setting data already stored in the storage medium 101.

Regarding settings for post-printing, features that require hardware processing, such as binding and stapling, need to be set along with features that each printer 2 supports. However, the GUI displayed via the application 120 is not the GUI of the individual driver 150 but the GUI of the additional feature driver 130. Accordingly, setting items supported by the printer 2 that ultimately executes the printing process on the GUI can be insufficient.

By contrast, if the reprint controlling module 140 calls the GUI of the individual driver 150 and presents it to a user, the aforementioned issues can be solved.

As described above, the individual driver 150 for each printer is used as the secondary driver in this embodiment, and the additional feature driver 130 is used as the primary driver that executes processes preliminary. The additional feature driver 130 implements various additional features. Accordingly, regardless of languages or specifications adopted by the individual driver 150, additional features can be freely designed.

Also, the additional feature driver 130 outputs data in generic format with open specifications as print data and print setting data in addition to implementing the aforementioned various additional features. In addition, the reprint controlling module 140 that commands the individual driver 150 to execute printing based on the output from the additional driver 130 as the primary driver is set. Accordingly, a printing process can be executed using a configuration in which the additional feature driver 130 works preliminarily to the individual driver 150.

Figure 10:
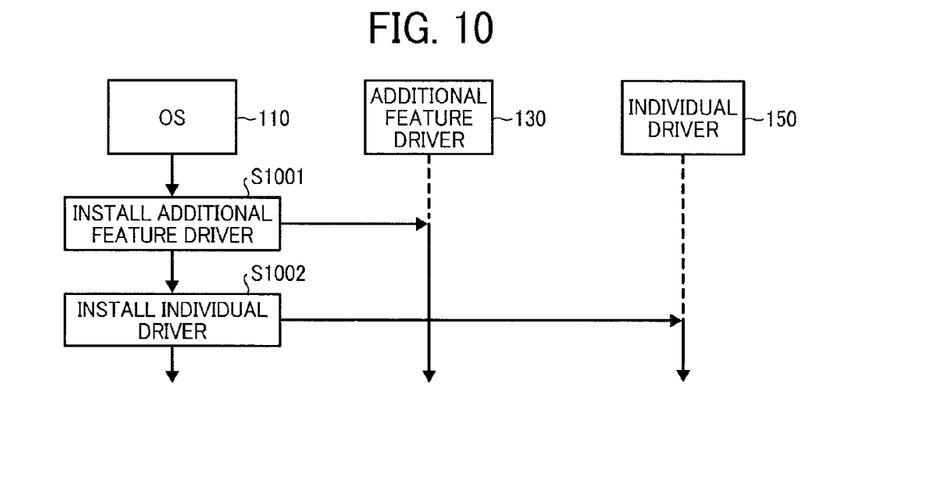
FIG. 10 is a sequence diagram illustrating an operation of a system as an embodiment of the present invention.

It should be noted that the case that both the additional feature driver 130 and the individual driver 150 are installed in the same PC 1 is taken as an example in the embodiment described above as shown in FIG. 1. In this case, a process to install the additional feature driver 130 and the individual driver 150 to the PC 1 is shown in FIG. 10. FIG. 10 is a sequence diagram illustrating the process to install the additional feature driver 130 and the individual driver 150 to the PC 1.

As shown in FIG. 10, the OS 110 installs the additional feature driver 130 to the PC 1 by storing a program that constructs the additional feature driver 130 in the HDD 14 (S1001). Accordingly, a user can run the additional feature driver 130 on the PC 1. Also, the OS 110 installs the individual driver 150 to the PC 1 by storing a program that constructs the individual driver 150 in the HDD 14 (S1002). Accordingly, a user can run the individual driver 150 on the PC 1.

It should be noted that the same effect of this embodiment can also be achieved in a configuration in which the additional feature driver 130 is installed in a different information processing apparatus from the information processing apparatus in which the individual driver is installed. In that case, the reprint controlling module 140 is set in each apparatus on which the additional feature driver 130 operates and the apparatus on which the individual driver 150 operates, and they operate just as in this embodiment described above by communicating with each other.

Figure 11:
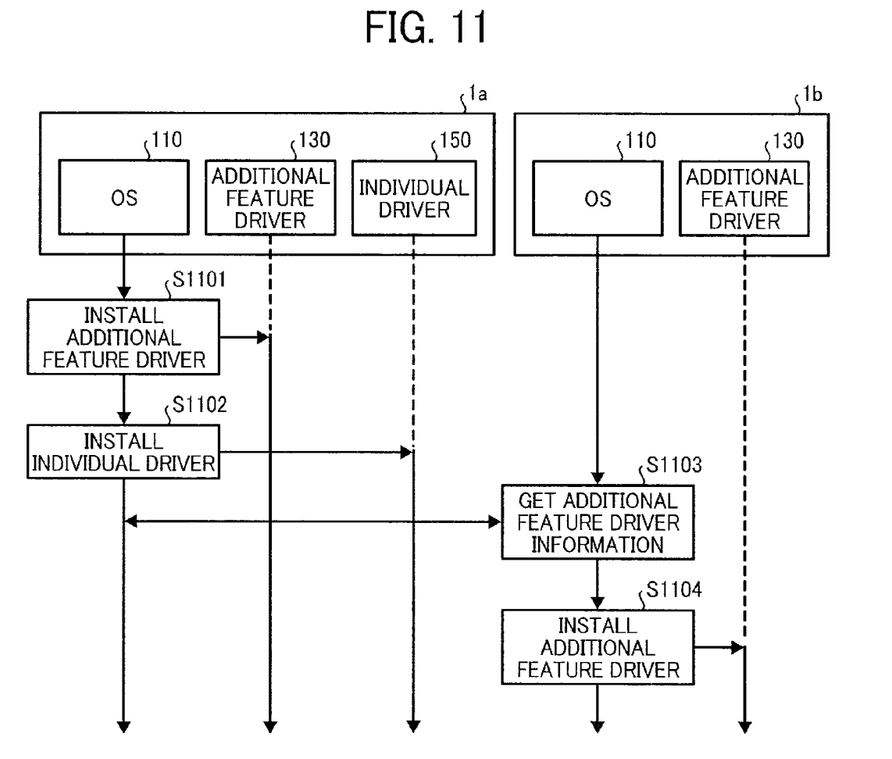
FIG. 11 is a sequence diagram illustrating an operation of a system as an embodiment of the present invention.

FIG. 11 is a sequence diagram illustrating the process to install the additional feature driver 130 and the individual driver 150 in case the additional feature driver 130 is installed in a PC 1a and the individual driver 150 is installed in a PC 1b, that is, in separate PCs. As shown in FIG. 11, the same effect of this embodiment can be achieved by installing only the additional feature driver 130 in the PC 1b and using the individual driver 150 installed in the PC 1a given that both the additional feature driver 130 and the individual driver 150 are installed in the PC 1a.

To achieve that goal, as shown in FIG. 11, the OS 110 on the PC 1a executes installation of the additional feature driver 130 and the individual driver 150 just like the processes shown in FIG. 10 (S1101, S1102). Subsequently, the OS 110 on the PC 1b acquires the program to construct the additional feature driver 130 and parameter information to be set from the OS 110 on the PC 1a via the network in response to a user operation (S1103).

In S1103, the OS 110 on the PC 1b exchanges information via the reprint controlling module 140 that runs on the PC 1b and the reprint controlling module 140 that runs on the PC 1a. The information acquired in S1103 includes programs to construct the additional feature driver 130, parameters necessary to execute communication by using the individual driver 150 installed on the PC 1b, and so on.

After acquiring the necessary information in S1103, the OS 110 on the PC 1b installs the additional feature driver by using the acquired information (S1104), and finishes processing. In S1104, in addition to storing the program that constructs the additional feature driver 130 in the HDD 14, etc. processes such as a parameter setting process necessary to communicate with PC 1a are also executed.

The order of installation of the additional feature driver 130 and individual driver 150 in FIG. 10 and FIG. 11 is not limited to that described above, and the individual driver 150 can be installed first. Also, in case a plurality of individual drivers 150 are set up as shown in FIG. 1, that can be achieved by repeating the processes of steps S1002 and S1001.

Also, in the embodiment described above, it is assumed that the additional feature driver 130 outputs information in a generic format with open specifications such as XPS and PrintTicket, and the individual driver 150 supports that information. However, the individual driver 150 might be a driver with outdated specifications, and it might not support information that the additional feature driver 130 outputs. Operation in such case is described below with reference to FIG. 12.

Figure 12:
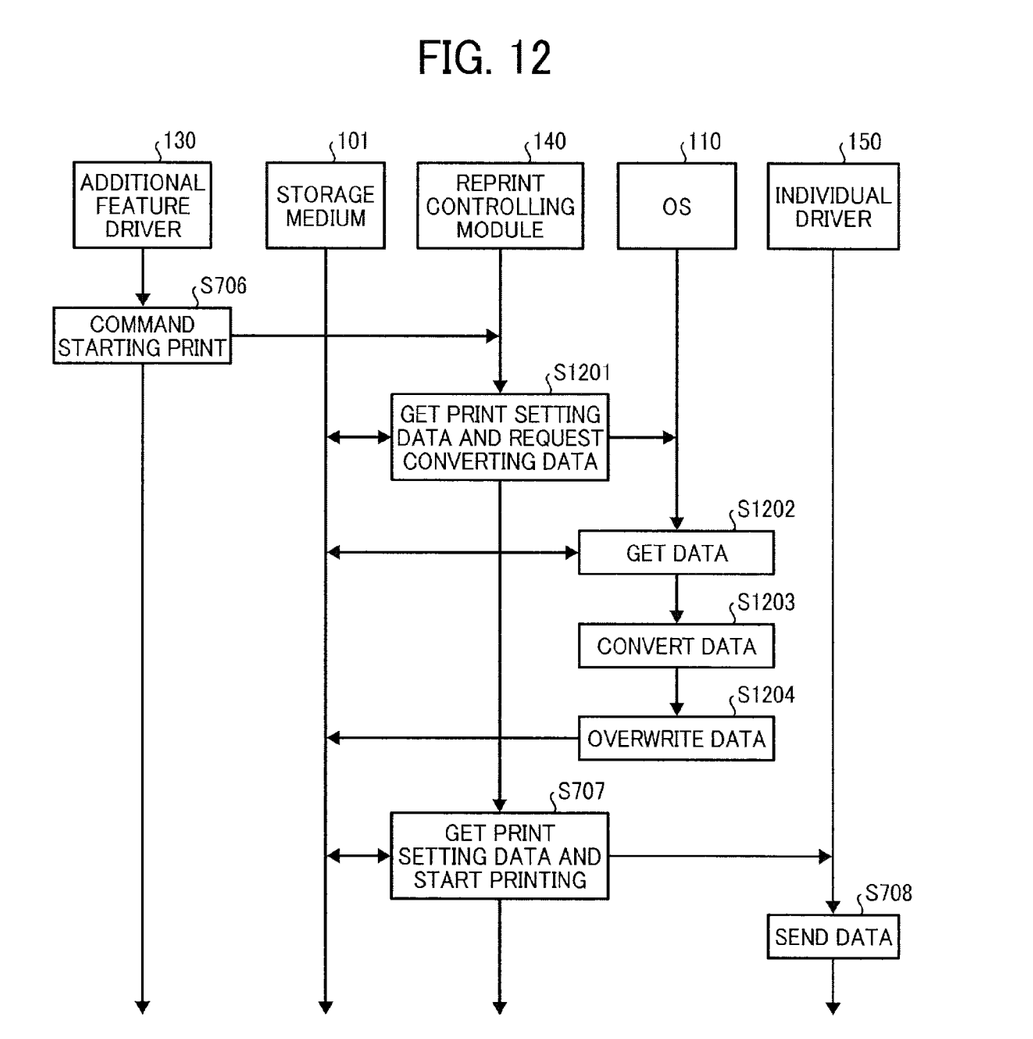
FIG. 12 is a sequence diagram illustrating an operation of a system as an embodiment of the present invention.

FIG. 12 is a sequence diagram mainly illustrating processes executed by the reprint controlling module 140 between S706 and S707 in FIG. 7. As shown in FIG. 12, after acquiring a command to start printing from the additional feature driver 130, the reprint controlling module 140 acquires a print setting data from the storage medium 101 and requests the OS 110 to convert the data if the print destination designated in the print settings, i.e. the individual driver 150, does not support the information format that the additional feature driver 130 outputs (S1201).

The OS 110 acquires the print data and the print setting data from the storage medium 101 in response to the request to convert the data from the reprint controlling module 140 (S1202), and converts the data to the format that the destination individual driver 150 supports (S1203). Subsequently, the reprint controlling module 140 overwrites the original data in the storage medium 101 with the converted data (S1204).

After the OS 110 finishes processing, the reprint controlling module 140 acquires the converted data and requests the individual driver 150 to start printing (S707). By executing these processes, the same effect described above can also be achieved even if the individual driver 150 is outdated and does not support the information format that the additional driver 130 outputs. It should be noted that the data format that the OS 110 converts can be EMF, for example.

Also, in the embodiment described above, after the process is passed from the additional feature driver 130 to the reprint controlling module 140 described with reference to FIG. 9, GUI of the individual driver 150 is displayed by the process that the reprint controlling module 140 executes. In such a case, a user needs to operate on both the GUI of the additional feature driver 130 and GUI of the individual driver 150, and that increases the burden on the user.

Figure 13:
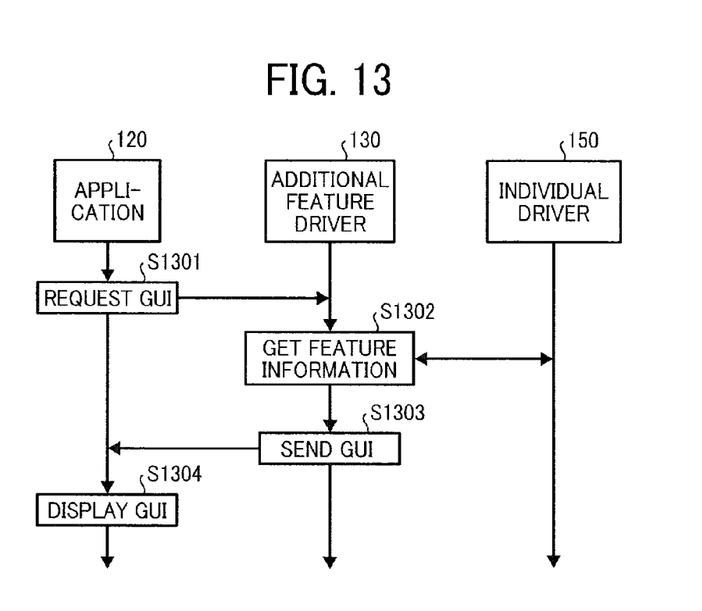
FIG. 13 is a sequence diagram illustrating an operation of a system as an embodiment of the present invention.

By contrast, if features of the individual driver 150 are also displayed in the GUI of the additional feature driver 130, issues of complicated operation described above can be solved. Such an example is described below. FIG. 13 is a sequence diagram illustrating an example embodiment that also displays features of the individual driver 150 in GUI of the additional feature driver 130, and it illustrates preliminary processes than S701 in FIG. 7.

After operating GUI display of a printer driver by a user, the application 120 requests the additional feature driver 130 to generate GUI as shown in FIG. 13 (S1301). After receiving the request for GUI from the application 120, the additional feature driver 130 acquires feature information from the individual driver 150 (S1302), and generates GUI that can configure the acquired feature information and sends it to the application 120 (S1303). The application 120 displays the GUI acquired from the additional feature driver 130 (S1304).

In S1303, as described above, in addition to generating GUI that can configure the acquired feature information, setting items not included in features of the individual driver 150 but included in GUI of the additional feature driver 130 can be disabled.

While the embodiment in FIG. 13 is the configuration that the additional feature driver 130 acquires feature information from the individual driver 150, exchanging information between drivers could be difficult in terms of software specification. In such a case, acquiring feature information of the individual driver 150 could be easy by the reprint controlling module 140's intermediating processes. Such embodiment is described below with reference to FIG. 14.

Figure 14:
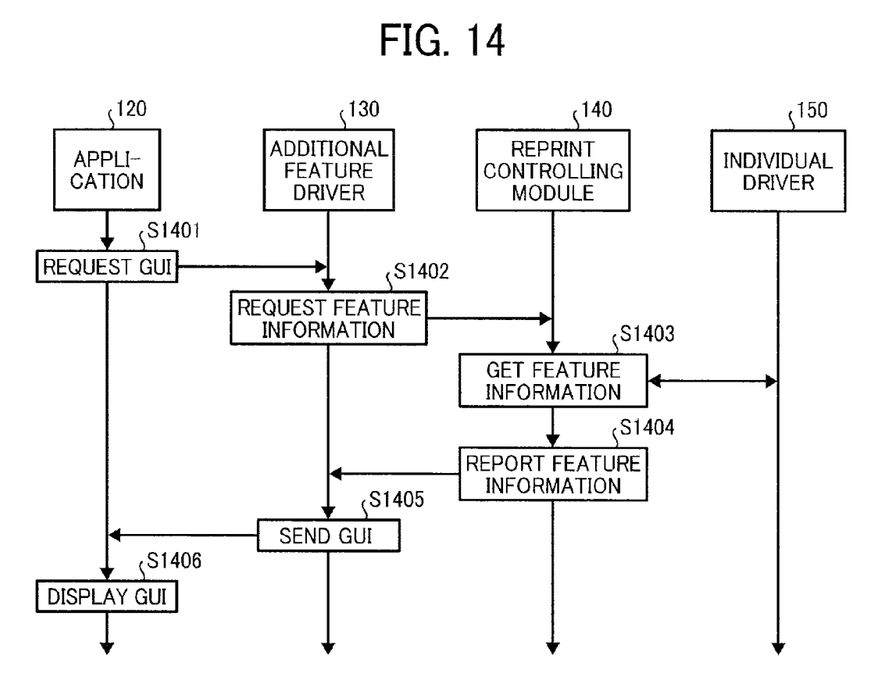
FIG. 14 is a sequence diagram illustrating an operation of a system as an embodiment of the present invention.

After operating the GUI of a printer driver by a user, the application 120 requests the additional feature driver 130 with the GUI as shown in FIG. 14 (S1401). After receiving the request for the GUI from the application 120, the additional feature driver 130 requests the reprint controlling module 140 with feature information specific to the targeted individual driver 150 (S1402).

After receiving the request for the feature information, the reprint controlling module 140 acquires the feature information from the individual driver 150 (S1403) and report the acquired feature information to the additional feature driver 130 (S1404). After receiving the feature information from the reprint controlling module 140, the additional feature driver 130 generates the GUI on which a user can configure the settings of the acquired feature information and sends the GUI to the application 120 (S1405). The application 120 displays the GUI acquired from the additional feature driver 130 (S1406).

By adopting these processes, even if direct information exchange between the additional feature driver 130 and the individual driver 150 is difficult, the additional feature driver 130 can acquire feature information of the individual driver 150, and GUI on which a user can configure the feature settings of the additional feature driver 130 and the individual driver 150 can be displayed as a whole.

It should be noted that a case in which feature information of the individual driver 150 is acquired is described above with reference to FIG. 13 and FIG. 14. This feature information can be either feature information of the printer 2 that the individual driver 150 acquires by communicating with the printer 2 at predefined intervals or information included in the individual driver 150 as information to be used to display the GUI of the individual driver 150.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A print controlling apparatus, comprising:
a processor including:
a first print information generating unit to acquire image data regarding an image to be printed and print settings to generate first print information in a format with open specifications;
a second print information generating unit to generate second print information to be sent to a printing apparatus designated in the print settings; and
a reprint controlling unit to receive the generated first print information and to have the second print information generating unit generate the second print information based on the generated first print information, the reprint controlling unit including a plurality of processing modules, wherein each of said processing modules performs processing based on a corresponding portion of the received first print information and associated information regarding an additional process to be performed to the corresponding portion of the received first print information, and wherein the reprint controlling unit has the second print information generating unit generate the second print information based on the additional process.

2. The print controlling apparatus according to claim 1, wherein the first print information includes image data in a format with open specifications converted from the image data regarding the image to be printed, and the reprint controlling unit outputs display information to display the image to be printed on a display device based on the image data in the converted format.

3. The print controlling apparatus according to claim 2, wherein one of said processing modules is configured to enable edits to the image data in the converted format in response to a user operation as the additional process.

4. The print controlling apparatus according to claim 1, wherein the first print information includes setting data in a format with open specifications converted from the print settings, and one of said processing modules is configured to edit the setting data in response to a user operation as the additional process.

5. The print controlling apparatus according to claim 4, wherein the reprint controlling unit acquires display information to display a setting screen to enable the user to configure the print settings for generating of the second print information by the second print information generating unit from the second print information generating unit after the first print information is generated, and outputs the display information.

6. The print controlling apparatus according to claim 1, wherein the first print information generating unit acquires information on a feature for generating the second print information by the second print information generating unit with acquisition of the print settings, generates a user interface on which a user can configure a feature for generating the first print information and the second print information, and outputs the user interface on a screen.

7. The print controlling apparatus according to claim 6, wherein the reprint controlling unit acquires information on a feature for generating the second print information by the second print information generating unit, and reports the information to the first print information generating unit in response to a request from the first print information generating unit.

8. The print controlling apparatus according to claim 1, wherein the reprint controlling unit has the second print information generating unit generate the second print information based on the generated first print information converted to a format different from the format with open specifications in accordance with the second print information generating unit designated in the print settings.

9. The print controlling apparatus according to claim 1, wherein the associated information regarding the additional process to be performed includes information indicating timing when each of said processing modules is called by the reprint controlling unit.

10. The print controlling apparatus according to claim 1, wherein the reprint controlling unit calls one of said processing modules to perform processing of the corresponding portion of the received first print information after and based on an indication that an initial print operation has ended.

11. The print controlling apparatus according to claim 1, wherein said processing modules include a preview module to display a preview of the image to be printed, a data processing module to process the image data in response to a first user input operation regarding the display of the preview, and a setting changing module to change one or more settings of the print settings in response to a second user input operation regarding the print settings.

12. A method of controlling printing apparatuses, comprising:
   acquiring image data regarding an image to be printed and print settings using a first printer driver;
   generating first print information in a format with open specifications by processing the acquired image data using a processor;
   performing processing, using the processor, of a corresponding portion of the generated first print information and of associated information regarding an additional process to be performed to the corresponding portion of the generated first print information; and
   based on the generated first print information and the associated information regarding the additional process to be performed, generating second print information to be sent to a printing apparatus designated in the acquired print settings using a second printer driver.

13. The method of controlling printing apparatuses according to claim 12,
   wherein the first print information includes image data in a format with open specifications converted from the image data regarding the image to be printed, and
   wherein the method further comprises outputting display information to display the image to be printed on a display device based on the image data in the converted format.

14. The method of controlling printing apparatuses according to claim 13, wherein the additional process includes editing the image data in the converted format in response to a user operation.

15. The method of controlling printing apparatuses according to claim 12,
   wherein the first print information includes setting data in a format with open specifications converted from the print settings, and
   wherein the method further comprises editing the setting data in response to a user operation.

16. The method of controlling printing apparatuses according to claim 15, further comprising:
   acquiring display information to display a setting screen to configure said generating of the second print information after the first print information is generated; and
   outputting the display information.

17. The method of controlling printing apparatuses according to claim 12, further comprising:
   acquiring information on a feature for generating the second print information with acquisition of the print settings;
   generating a user interface on which a user can configure a feature for generating the first print information and the second print information; and
   outputting the user interface on a screen.

18. The method of controlling printing apparatuses according to claim 17, further comprising:
   acquiring information on a feature for generating the second print information; and
   reporting the information to the first printer driver in response to a request from the first printer driver.

19. The method of controlling printing apparatuses according to claim 12, further comprising having the second printer driver generate the second print information based on the generated first print information converted to a format different from the format with open specifications in accordance with the second printer driver designated in the print settings.

20. A non-transitory computer-readable storage medium storing a program that, when executed by a computer, causes the computer to implement a method of controlling a printing apparatus, the method comprising:
   acquiring image data regarding an image to be printed and print settings using a first printer driver;
   generating first print information in a format with open specifications by processing the acquired image data;
   processing a corresponding portion of the generated first print information and associated information regarding an additional process to be performed to the corresponding portion of the generated first print information; and
   based on the generated first print information and the associated information regarding the additional process to be performed, generating second print information to be sent to a printing apparatus designated in the acquired print settings using a second printer driver.

* * * * *